US006642535B2

(12) United States Patent
Gebele et al.

(10) Patent No.: US 6,642,535 B2
(45) Date of Patent: Nov. 4, 2003

(54) APPARATUS FOR READING INFORMATION STORED IN A MEMORY LAYER AND AN X-RAY CASSETTE FOR USE WITH THE APPARATUS

(75) Inventors: Herbert Gebele, Sauerlach (DE); Robert Fasbender, Ottobrunn (DE); Martin Lind, Munich (DE); Juergen Mueller, Munich (DE); Georg Reiser, Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 71 days.

(21) Appl. No.: 09/734,817

(22) Filed: Dec. 12, 2000

(65) Prior Publication Data

US 2001/0006222 A1 Jul. 5, 2001

(30) Foreign Application Priority Data

Dec. 23, 1999 (DE) .......................... 199 62 775

(51) Int. Cl.[7] .............................................. G03B 42/02
(52) U.S. Cl. ...................................... 250/584; 250/586
(58) Field of Search ................................ 250/584, 586, 250/581, 582

(56) References Cited

U.S. PATENT DOCUMENTS

| 4,814,617 A | * | 3/1989 | Goto ............................ 250/586 |
| 4,887,139 A | * | 12/1989 | Komatsu ..................... 250/586 |
| 4,922,103 A | * | 5/1990 | Kawajiri et al. ............ 250/586 |
| 4,959,736 A | | 9/1990 | Mino et al. |
| 4,970,394 A | * | 11/1990 | Boutet et al. ................ 250/586 |
| 5,444,266 A | * | 8/1995 | Takeda et al. ............... 250/586 |
| 5,661,309 A | * | 8/1997 | Jeromin et al. ......... 250/370.09 |
| 5,773,832 A | * | 6/1998 | Sayed et al. ........... 250/370.09 |
| 5,877,492 A | | 3/1999 | Fujieda et al. |
| 5,998,802 A | * | 12/1999 | Struye et al. ................ 250/584 |
| 6,326,636 B1 | * | 12/2001 | Isoda et al. .................. 250/584 |

FOREIGN PATENT DOCUMENTS

| EP | 0863656 | 9/1998 |
| WO | 9928765 | 6/1999 |

* cited by examiner

Primary Examiner—Albert Gagliardi
(74) Attorney, Agent, or Firm—Milde & Hoffberg, LLP

(57) ABSTRACT

An X-Ray cassette (1) and a device (10) for reading information stored in a memory layer (15) are disclosed. This device (10) contains a radiation source (11) to excite a row (34) of the memory layer (15). The row (34) emits an emission radiation (17) because of this excitation. The device (10) based on the invention contains a receptor (12) to receive the emission radiation (17). The receptor (12) includes a number of light-sensitive surfaces (18) that are arranged in adjacent rows. According to the invention, the dimension of the light-sensitive surfaces (18) of the receptor (12) arranged perpendicular to the orientation (A) of the rows (34) is greater than that oriented along the row direction (B). Alternatively or additionally, the device can include an optical projector (14) by means of which the emission radiation (17) is projected onto the receptor (12). The numerical aperture of the optical projector (14) with respect to the excited row (34) arranged perpendicular to the orientation (A) of the rows (34) is larger than along direction (B).

11 Claims, 5 Drawing Sheets

APPARATUS FOR READING INFORMATION STORED IN A MEMORY LAYER AND AN X-RAY CASSETTE FOR USE WITH THE APPARATUS

BACKGROUND OF THE INVENTION

The present invention relates to apparatus for reading information stored in a memory layer, such as an X-ray memory layer, and an X-Ray cassette for use with the apparatus.

Particularly for medical purposes, an image of an object (such as a patient) is created using X-ray radiation that is stored in a memory layer as a latent image. A phosphorus film base is often used for this memory layer. In order to read the X-ray image stored in the memory layer, the memory layer is excited using a radiation source. Because of this excitation, the memory layer radiates light of an intensity corresponding to the stored X-ray image. The light emitted from the memory layer is received by a receptor and eventually converted into electrical signals so that the X-ray image stored in the memory layer can then be made visible. The X-ray image can, for example, be projected directly on a monitor or printed onto a special photographic X-ray film suitable for X-ray images.

Such a device used to read out information stored in a memory layer is known, for example, from published International Patent Application No. WO 99/28765. In this known device, the memory layer is excited by rows by an exciter beam that is created by a radiation source. This radiation source may be a laser diode strip, for example. The light emitted because of excitation of the memory layer is received by a receptor. For this purpose, the receptor contains a number of light-sensitive surfaces that are arranged in adjacent rows. The radiation emitted from the memory layer is received by the light-sensitive surfaces. The receptor may be a Charge-Coupled-Device (CCD) that contains a number of photo-detectors arranged in adjacent rows. These light-sensitive surfaces are usually symmetrical.

It is known from the aforementioned publication No. WO 99/28765 that the size of the excited points on the memory layer is dependent upon the size of the light-sensitive surfaces of the individual photo-detectors of the receptor. To ensure a high degree of focus and high resolution of the X-ray image read from the memory layer, the size of the individual points should be kept small. This is particularly necessary for mammography applications. In the known apparatus, a projection device can be placed between the memory layer and the receptor by means of which the emission radiation emitted from excited rows of the memory layer is projected onto the receptor. So-called Selfoc lenses or micro lenses may be used as a projection device. These have small dimensions, so that the separation between the memory layer and the receptor can be kept small. The optical input surfaces and the Selfoc or micro lenses are symmetrical.

SUMMARY OF THE INVENTION

Based on the principle advanced by the aforementioned publication No. WO 99/28765, the principal objective of the present invention is to enable improved quality during the reproduction of information stored in a memory layer.

This objective, as well as other objectives which will become apparent from the discussion that follows, are achieved, in accordance with the present invention, by providing the receptor with light sensitive services arranged in adjacent rows, wherein the dimension of the light sensitive surfaces arranged perpendicular to the orientation of the rows is greater than that oriented along the row direction. Alternatively or additionally, the apparatus can include an optical projection device which projects the emission radiation onto the receptor. The numerical aperture of the projection device with respect to the excited row arranged perpendicular to the orientation of the rows is made larger than the aperture along the row direction.

This invention achieves a high degree of focus during projection of the emission radiation emitted from the memory layer to the receptor, and high collection efficiency during collection of the radiation emitted by the memory layer. Based on this invention, the light-sensitive surfaces of the receptor or the aperture angle at which the optical projection device receives the radiation emitted from the memory layer are asymmetrical. The invention is based on the surprising fact that a high degree of focus during projection of the information onto the receptor in the direction of the excited rows may be ensured, and simultaneously that this good focus need not necessarily be maintained during projection of the information onto the receptor perpendicular to the orientation of the row. According to the arrangement based on the invention, the quantity (and thereby the intensity) of the emission radiation received by the receptor perpendicular to the orientation of the row is increased in comparison with a symmetrical configuration. In this manner, an improved signal-to-noise ratio is achieved during reception of the information.

In a particularly advantageous embodiment of the invention, both the light-sensitive surfaces of the receptor and the aperture angle of the optical projection device (with respect to the excited rows) are asymmetrical. Thus, the information stored in the memory layer may be more accurately projected onto the receptor. Reproduction of this information may therefore be qualitatively further improved.

In a further particularly advantageous embodiment of the invention, the light-sensitive surfaces of the receptor are so arranged that they are two to eight times (in particular, two to four times) as large perpendicular to the orientation of the rows as they are parallel to the orientation of the rows. These dimensions allow an optimum signal-to-noise ratio while maintaining a high degree of focus of information projection onto the receptor.

The optical projection device can be advantageously arranged that, during the projection of the emission radiation onto the receptor, the orientation of the information read during projection onto the receptor along the row is the same as the orientation of the stored information in the memory layer. Thus, using matched optical components, projection of a non-inverted image of the information read onto the receptor is ensured. It is also possible to create the non-inverted image by the use of suitable electronic image data processing. This, however, requires a large amount of computing power that can be avoided by the use of the optical projection device.

Further, the optical projection device can advantageously also include a filter to prevent excitation radiation used to excite the memory layer from being received by the receptor. The reproduction quality of the stored information is thereby further improved. Distortion during reproduction of the information caused by the detection of excitation radiation by the receptor would be prevented.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
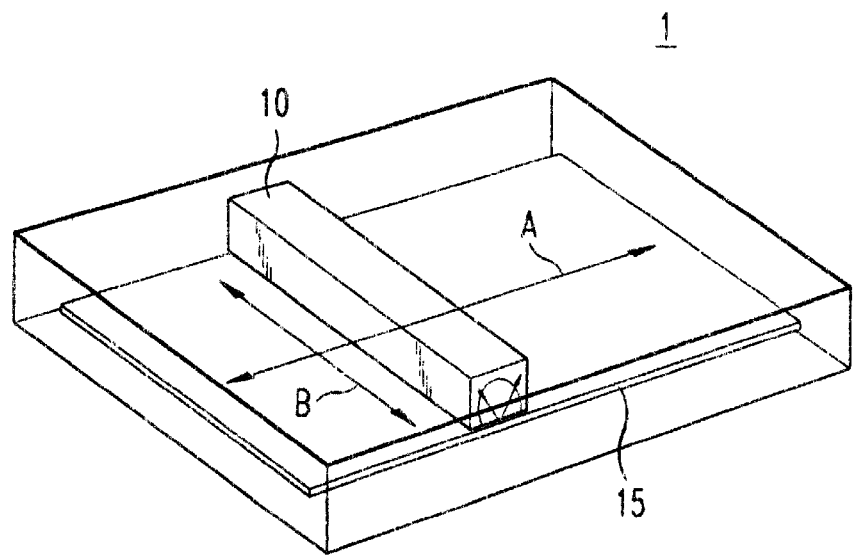
FIG. 1 is a schematic representation of an embodiment example of the X-ray cassette based on the invention.

The preferred embodiments of the present invention will now be described with reference to FIGS. 1–6 of the drawings. Identical elements in the various figures are designated with the same reference numerals.

FIG. 1 shows a perspective view of an X-ray cassette 1 that includes a reader device based on this invention in the form of a reader head 10. The X-ray cassette 1 contains a memory layer 15 that is represented here by a phosphor layer containing a layer of phosphor material about 300 $\mu$m thick. This phosphor material may be brought into an excited state by X-ray radiation. In this manner, an X-ray image of an object is stored in the phosphor layer 15. The phosphor layer 15 can be stimulated by radiation with an exciter beam (particularly one within the red wavelengths) so that it produces an emission radiation that is, in particular, within the blue or ultraviolet wavelengths. The quantity (intensity) of the emission radiation emitted by the stimulated phosphor layer 15 is a reflection of the previously-recorded quantity of X-radiation. Each point of the phosphor layer 15 that was excited to emit emission radiation produces emission radiation in the form of Lambert radiation. The phosphor layer 15 is a Lambert emitter. Such a Lambert emitter emits radiation in all directions. The reader head 10 contains a radiation source to produce the exciter beam used to stimulate the phosphor layer 15. Further, the reader head 10 contains a receptor to receive the emission radiation emitted from the phosphor layer 15. The radiation source and the receptor are firmly connected to each other in the reader head 10. The reader head 10 extends across the entire width of the phosphor layer 15. By means of the reader head 10, all the information stored in a row of the phosphor layer 15 can be read simultaneously. The row essentially extends across the entire width of the phosphor layer 15. Reference Index B in FIG. 1 indicates the row orientation. The reader head 10 may be displaced perpendicular to the orientation of the row by a drive (not shown in FIG. 1), i.e., along the longitudinal direction of the phosphor layer 15, in the direction of the arrow with Reference Index A. A therefore represents the displacement direction of the reader head 10 perpendicular to the rows.

Figure 2:
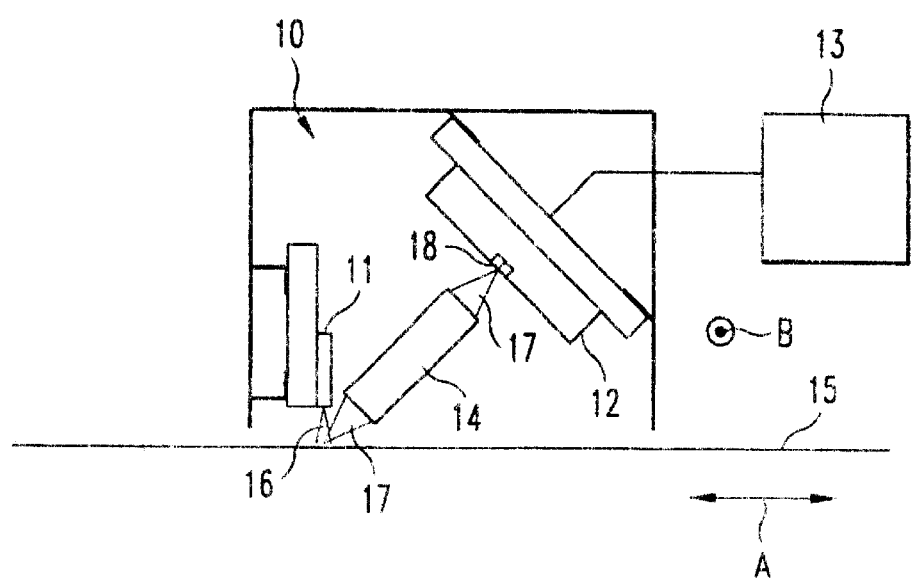
FIG. 2 is a cross sectional view of a preferred embodiment of a reader head based on the invention to read information stored in a memory layer.

FIG. 2 shows a cross-section of the reader head 10 perpendicular to row orientation B. FIG. 2 shows a radiation source 11 within reader head 10 used to excite a row of the phosphor layer 15. The radiation source 11 here is a row of laser diodes. The row of laser diodes 11 is so arranged above the phosphor layer 15 that the beams emitted from individual laser diodes strike directly onto the phosphor layer 15. An optical lens can be provided between the row of laser diodes 11 and the phosphor layer 15 to focus the emitted exciter beam from the row of laser diodes 11. FIG. 2 further shows a receptor 12 used to receive the emission radiation produced by the phosphor layer 15. In this embodiment example, the receptor 12 consists of a row of CCD devices. The CCD row 12 contains a number of photo-detectors arranged parallel and adjacent to one another in a row with light-sensitive surfaces 18. The CCD row 12 performs a photo-electric conversion of the received light radiation. A projection device 14 is positioned between the phosphor layer 15 and the CCD row 12. This projection device 14 serves to project the radiation emitted from the excited rows of the phosphor layer 15 onto the light-sensitive surfaces 18 of the CCD row 12. A number of adjacent row-shaped micro-lenses can be used as the projection device 14.

The exciter beam emitted by the action of the laser diodes row 11 is labeled with Reference Index 16 in FIG. 2. The emission radiation emitted from the phosphor layer 15 by means of excitation from the exciter beam 16 is identified in FIG. 2 by the reference numeral 17.

The output of the CCD row 12 is connected to a data processing device 13. This data processing device 13 is assigned the task of evaluating and processing the electrical signals produced by the CCD row 12 that contain a representation of the image information stored in the phosphor layer 15. Additionally, the data processing device controls the displacement of the reader head 10 across the phosphor layer 15.

Figure 3:
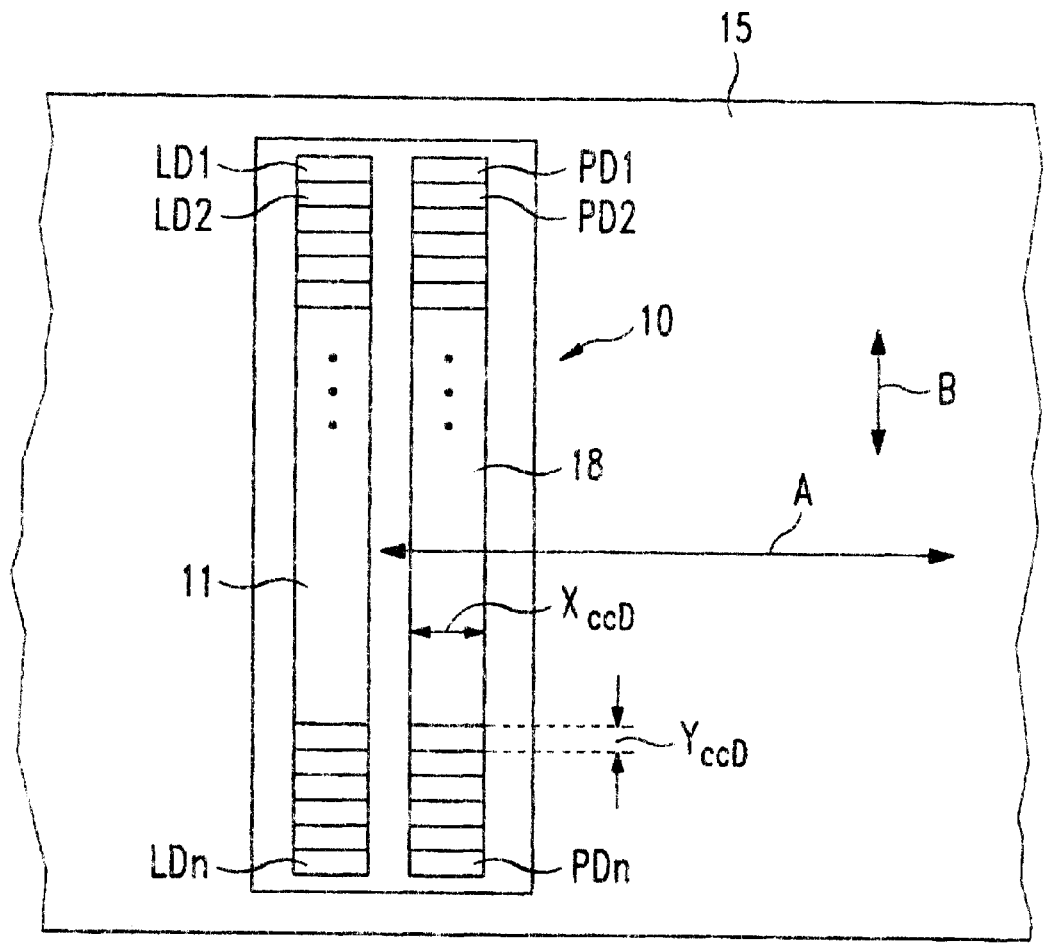
FIG. 3 is a plan view of a preferred embodiment of a reader head based on the invention according to FIG. 2 with asymmetrical light-sensitive receptor surfaces.

FIG. 3 shows another view of the reader head 10 based on the invention that was shown in the embodiment of FIG. 2. FIG. 3 shows an overhead view of the reader head 10 and the phosphor layer 15 based on the invention. This is a cross-section through the laser diode strip 11 and the CCD row 12 parallel to the phosphor layer 15 and the displacement direction A of the reader head 10. FIG. 3 shows a number of laser diodes $LD_1$ to $LD_n$ arranged adjacently in a row. By means of laser diodes $LD_1$ to $LD_n$, the entire width of the rectangular phosphor layer 15 (in which information can be stored) can be excited to the point of radiation. In this embodiment model, the laser diode strip 11 contains 4,096 laser diodes. There can also be fewer laser diodes in the laser diode strip 11. It is possible to at least partially overlap the laser beams emitted from the laser diodes using appropriate optical lenses so that a smaller number of laser diodes might also excite the entire width of the row.

FIG. 3 further shows the light-sensitive surfaces 18 of the CCD row 12 (FIG. 2). The CCD row contains photo-detectors $PD_1$ to $PD_n$. Each photo-detector $PD_1$ to $PD_n$ has a light-sensitive surface. In this embodiment model as shown in FIG. 3, the light-sensitive surfaces 18 of the photo-detectors $PD_1$ to $PD_n$ are asymmetrical. The individual light-sensitive surfaces 18 of photo-detectors $PD_1$ to $PD_n$ here are rectangular in shape. They might also be elliptical, for example. The individual photo-detectors $PD_1$ to $PD_n$ have light-sensitive surfaces with a dimension $Y_{CCD}$ along row direction B and a dimension $X_{CCD}$ along the row in displacement direction A (that is, perpendicular to row direction B). $Y_{CCD}$ is smaller than $X_{CCD}$. Advantageously, the dimension of the light-sensitive surfaces 18 perpendicular to the row orientation is preferably two to eight times as great as that along the row orientation. $Y_{CCD}$ here is about 150 $\mu$m and $X_{CCD}$ is about 400 $\mu$m. This dimension of $X_{CCD}$ (400 $\mu$m) is particularly advantageous since, with this relationship, a very good ratio of collected information to CCD background noise may be achieved. In these embodiment examples, the reader head 10 contains 4,096 row-shaped photo-detectors arranged adjacently.

By the irradiation of the phosphor layer 15 with X-rays, memory centers that contain the information to be read are created within the phosphorus. The excitation caused by the laser diode strip 11 creates in the phosphor layer 15 a number of adjacent scattering circles from which radiation to the surface of the phosphor layer 15 is emitted. Each scattering circle is dependent on the particular type of phosphor layer, particularly on the grain size, the phosphorescent particles, or the layer thickness of the phosphors used for the phosphor layer 15. These scattering circles are formed since excitation radiation emitted from the light diode row 11 is scattered within the phosphor layer 15 depending on the specific characteristics of the phosphors used. The radiation emitted from the scattering circles because of the excitation radiation is also scattered as it makes its way from the memory center to the upper surface of the phosphor layer 15. As a result of this scattering, decreased focus occurs during readout of the information stored within the phosphor layer 15. This decreased focus is specific to the type of phosphor used. This lack of focus results in the fact that the information contained at a point within the phosphor layer 15 emerges at the surface of the phosphor layer 15 at a location not directly above that point. Rather, this information that is assigned to a specific point within the phosphor layer 15 appears within the scattering circle on the surface of the phosphor layer 15 assigned to that point. Since a row of the phosphor layer 15 is simultaneously excited by the reader device described here, a partial overlap of the scattering circles occurs.

The lack of focus created by the overlap of the scattering circles, and thereby of the information, is recreated on the assigned photo-detectors of the CCD row 12. This creates readout errors. Specific allowable lack of focus is prescribed for certain medical applications. To ensure the prescribed focus, the dimension of the light-sensitive surfaces of the photo-detectors along row orientation B is adjusted to this prescribed focus. The smaller the dimension of light-sensitive surfaces of the photo-detectors along row orientation B, the better the focus. On the other hand, the size of the dimensions of the light-sensitive surfaces of the photo-detectors determines the quantity of receivable radiation intensity, and thereby the collection efficiency. The greater the light-sensitive surface of the photo-detectors, the more radiation from an excited point can be received by this light-sensitive surface on phosphor layer 15.

Figure 4:
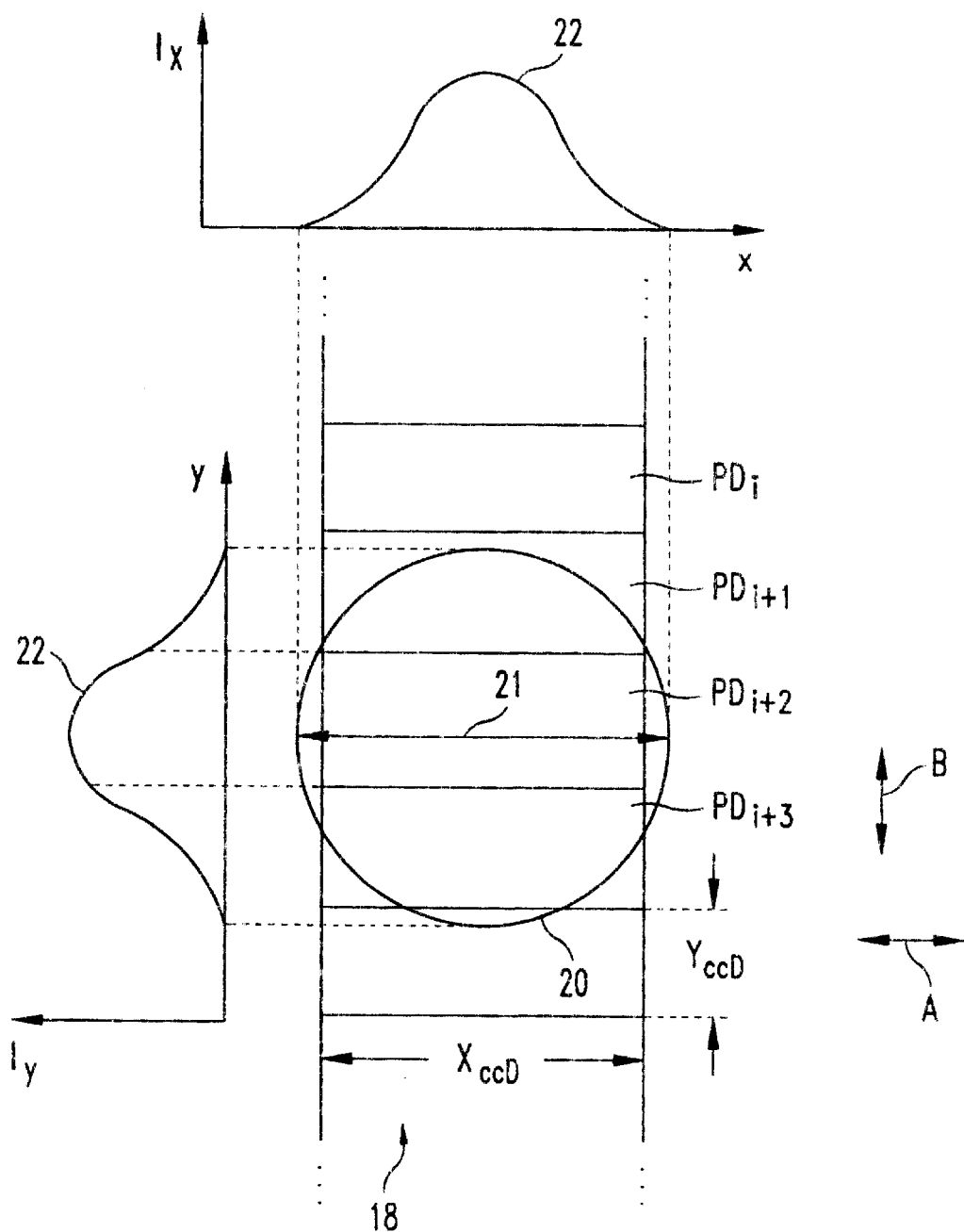
FIG. 4 is a schematic representation of a scattering circle formed on the light-sensitive receptor surfaces of the emission radiation.

FIG. 4 shows an example of a scattering circle 20 that occurs on the surface of the phosphor because of a point radiation of a phosphor when the phosphor was previously irradiated with evenly-distributed X-ray radiation, so that homogenously-distributed information is stored within the phosphor. The scattering circle 20 has a scattering diameter 21. The distribution of the intensity of the emission radiation striking within this scattering circle 20 is Gaussian both in row direction B and perpendicular to direction A. This may be seen in the upper left area of coordinate system containing curves shown in FIG. 4. The coordinate system in the upper area of FIG. 4 shows the Gaussian progression of intensity of the emission radiation perpendicular to row direction A. The abscissa represents the point X of the scattering circle perpendicular to row direction A. The ordinate represents the intensity $I_x$ of the intensity of the emission radiation perpendicular to row direction A. The same applies to the coordinate system in the left area of FIG. 4. The abscissa represents the point Y in row direction B, and the ordinate represents the intensity $I_y$ of the emission radiation in row direction B. This representation shows that a particularly good focus in the projection of the emission radiation striking within the scattering circle 20 is achieved if the dimension of the light-sensitive surface of the photo-detectors is as small as possible.

FIG. 4 further shows a portion of the CCD row 12 with several adjacent photo-detectors $PD_i$ to $PD_{i+3}$. The scattering circle 20 created by the point radiation of the phosphor is to be projected here onto the photo-detectors of the CCD row. This is shown schematically in FIG. 4 in that the scattering circle 20 is designated in the arrangement of the photo-detectors. The scattering circle 20 extends in the example shown in FIG. 4 essentially above the photo-detectors $PD_{i+1}$ to $PD_{i+3}$. The light-sensitive surfaces 18 of the photo-detectors shown include a dimension of $Y_{CCD}$ along row direction B and a dimension of $X_{CCD}$ perpendicular to row direction A. $Y_{CCD}$ is smaller than $X_{CCD}$. The light-sensitive surfaces of the photo-detector are thereby asymmetrical and have a rectangular surface. It is also possible to deploy the light-sensitive surfaces of the photo-detectors in other asymmetrical configurations, e.g. as ellipses.

As FIG. 4 shows, the greatest portion of the intensity of the radiation emitted within the scattering circle along row direction B is received by the light-sensitive surface of photo-detector $PD_{i+2}$. As a result of the Gaussian emission radiation intensity distribution, the photo-detectors $PD_{i+1}$ and $PD_{i+3}$ adjacent to $PD_{i+2}$ receive a significantly reduced intensity of the radiation emitted along row direction B.

FIG. 4 shows that, as viewed perpendicular to row direction A, the Gaussian intensity of the scattering circle 20 is completely received mainly by the light-sensitive surfaces because of the dimension Xccd of the photo-detector light-sensitive surfaces 18. The scattering circle 20 has a scattering circle diameter 21 that is only slightly larger than the length Xccd of the photo detector light sensitive surfaces 18. In this manner, a high degree of collection efficiency can be ensured during collection of the emission radiation emitted by the phosphor layer in the direction perpendicular to the row. A high degree of focus during projection of the emission radiation perpendicular to the row orientation is abandoned by the invention. Only scattering circles of a single point are collected during row-by-row excitation of the phosphor layer and during row-by-row reception of emission radiation, as viewed perpendicular to the row direction.

Because of the noise of each photo-detector, it is advantageous to make the dimension $X_{CCD}$ of the photo-detector light-sensitive surfaces less than the scattering circle diameter 21. As can be seen from the Gauss-shaped intensity distribution in the coordinate system shown in the upper area of FIG. 4, the amount of emission radiation intensity that is produced by the scattering circle 20 perpendicular to the row orientation and exceeding the dimension $X_{CCD}$ of the photo-detector light-sensitive surfaces 18 is very low. Since the noise level of each photo-detector is dependent on the size of the light-sensitive surface, increasing the light-sensitive surface beyond the dimension $X_{CCD}$ does not result in an improvement in signal-to-noise ratio. The dimension $X_{CCD}$ of individual light-sensitive surfaces 18 is substantially therefore advantageously dependent on its noise.

Figure 5:
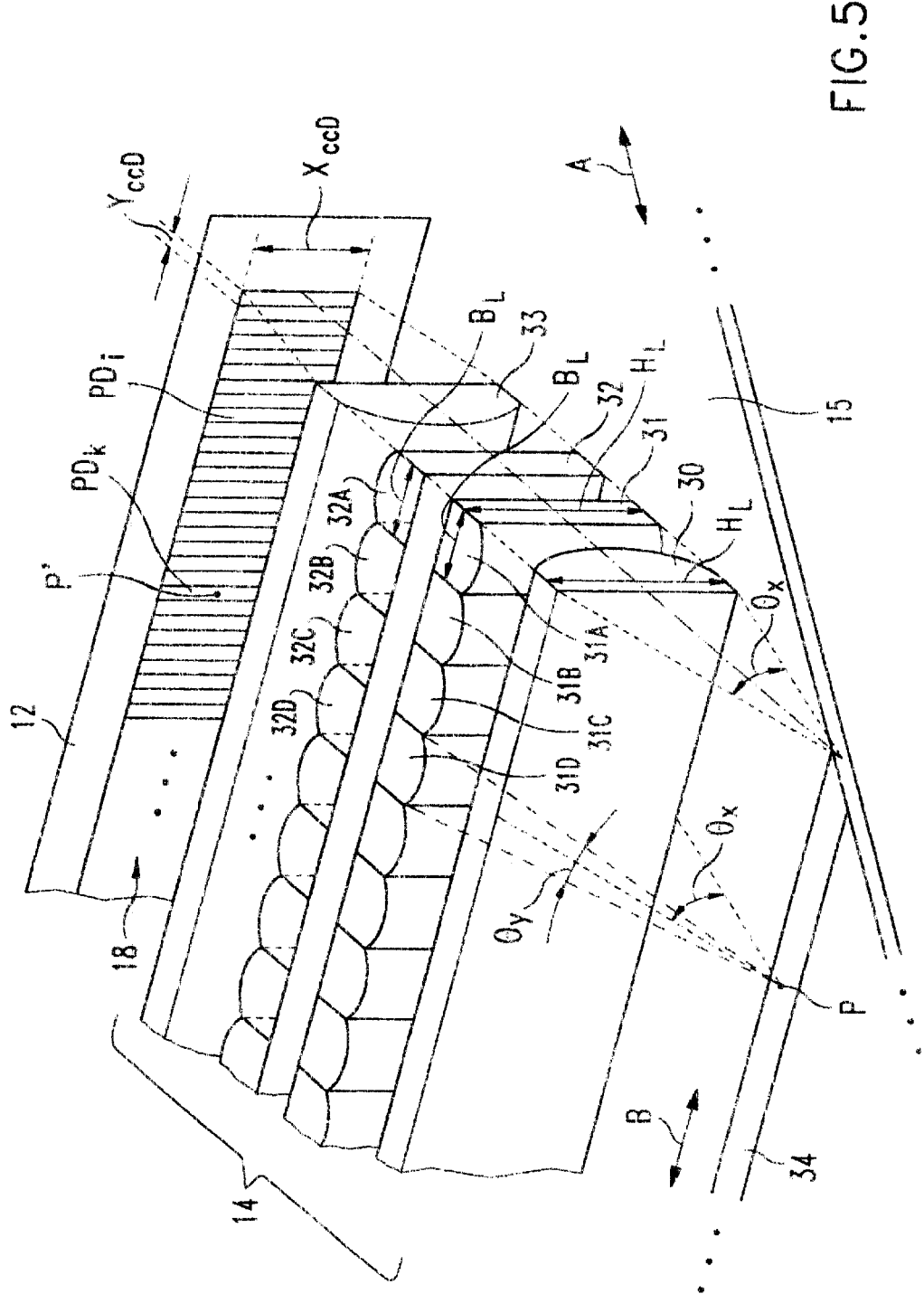
FIG. 5 is a schematic representation of a device based on the invention with a first preferred embodiment of the optical projection device.

FIG. 5 shows another embodiment example of the reader device based on the invention and a detailed representation of the projection device 14 used to project the emission radiation from the phosphor layer 15 onto the light-sensitive surfaces 18 of the CCD row 12. According to the embodiment example shown in FIG. 5, the projection device 14 contains the first collection lens 30 adjacent to the phosphor layer 15. Behind this first collection lens 30 is a second collection lens 31. This collection lens 31 contains a number of lens sections 31A, 31B, . . . , that are basically in the form of cylindrical lenses that include cylindrical axes extending perpendicular to row direction B. Individual sections 31A, 31B, . . . , of the collection lens 31 each have a width of $B_L$ along row direction B. The height of individual projection device 14 lenses 30, 31, 32, and 33 is $H_L$ perpendicular to row orientation B. Behind the second collection lens 31 is a third collection lens 32 that (like collection lens 31) is divided into individual sections 32A, 32B, . . . These sections 32A, 32B, . . . , are (like second collection lens 31) also cylindrical lenses whose cylindrical axes are perpendicular to row orientation B. The third collection lens 32 is so arranged within the projection device 14 as a mirror reflection to second collection lens 31, i.e., as a mirror reflection about the plane parallel to the cylindrical axes of individual sections 31A, 31B, . . . Behind the third collection lens 32 is a fourth collection lens 33. This is also a cylindrical lens. The cylindrical axis of the fourth collection lens 33 is along row orientation B.

The projection device 14 according to the embodiment example shown in FIG. 5 includes an asymmetrical aperture character with reference to the row of the excited phosphor layer 15 to be projected because of the arrangement described above along orientation A and perpendicular to orientation B. The aperture angles of the projection device 14 along the orientation of the row and perpendicular to it are different. The aperture angle along the orientation of the row is smaller than that perpendicular to the row orientation.

FIG. 5 shows a row 34 on the phosphor layer 15 that was excited by the laser diode strip 11 to produce an emission radiation. Point P designated in FIG. 5 represents all points of the row 34. This point is projected via the projection device 14 onto the light-sensitive surface of the photo-detector $PD_K$ of CCD row 12. The projection of point P of the excited row 34 is designated in FIG. 5 as projection point P' in the photo-detector $PD_K$ of CCD row 12. In order to more clearly describe the invention, the aperture angle (opening angle) of the projection device 14 is included in FIG. 5 by means of which the Lambert-shaped emission radiation produced from point P is projected both in the direction of the row B and perpendicular to the direction of row B onto the photo-detector $PD_K$. The aperture angle perpendicular to the row orientation is mainly determined by the first collection lens 30. It is dependent on the height $H_L$ of the first collection lens 30 and the separation of the excited row from the first collection lens 30. This produces an aperture angle $\theta_X$ perpendicular to the orientation of the row.

The aperture angle along row orientation B is dependent on the width $B_L$ of the individual sections 31A, 31B, . . . , of the second collection lens 31 and its separation from the row. In this embodiment example as shown in FIG. 5, the Lambert-shaped emission radiation emitted from point P is determined by the arrangement and dimension of the section 31D of the second collection lens. The aperture angle (opening angle) along row orientation B through which the radiation emitted from point P is collected for the projection onto the photo-detector $PD_X$ is $\theta_Y$ in FIG. 5. It is determined by the separation of point P from the second collection lens 31 and the width $B_L$ of section 31D.

As may be seen from FIG. 5, the aperture angle $\theta_X$ is larger than aperture angle $\theta_Y$. This results in the fact that the numerical aperture of the projection device 14 perpendicular to direction A of the row 34 is greater than the numerical aperture of the projection device 14 along direction B of the row 34. The numerical aperture NA results from the sine of half of the aperture angle $NA_{[XY]}=[n]* \sin (U_{xy})$. "n" represents the refractivity of the material in front of the projection device 14. Since this material in the embodiment example is air, n=1. $U_{xy}$ represents half of the opening angle $\theta_X$, or $\theta_Y$.

A filter can be advantageously inserted into the radiation projection process to project the radiation onto light-sensitive surfaces 18 of the CCD row 12, by means of which a beam may be filtered out that is in the wavelength range of the exciter beam emitted by the laser diode strip 11. This prevents excitation radiation from being received by the photo-detectors of the CCD row 12. The filter can additionally be so configured that it filters out one of the photo-luminescent beams emitted from the phosphor layer 15. This photo-luminescent beam is emitted by the phosphor layer 15 independently of the stored information. It is also possible to provide a dedicated filter for the photo-luminescent beam that is appropriately configured.

Such a filter can be advantageously positioned between the projection device 14 and the CCD row 12. The projection device can then be located close to the phosphor layer 15. In this manner, a large aperture might be used to capture the emission radiation emitted from the excited row 34 both along the row direction and perpendicular to it. In a further, even more advantageous embodiment, the projection device 14 or one of its lens components might be fashioned from a material that acts as a filter for the exciter beam emitted from the laser diode strip 11 and/or the photo-luminescent radiation.

Figure 6:
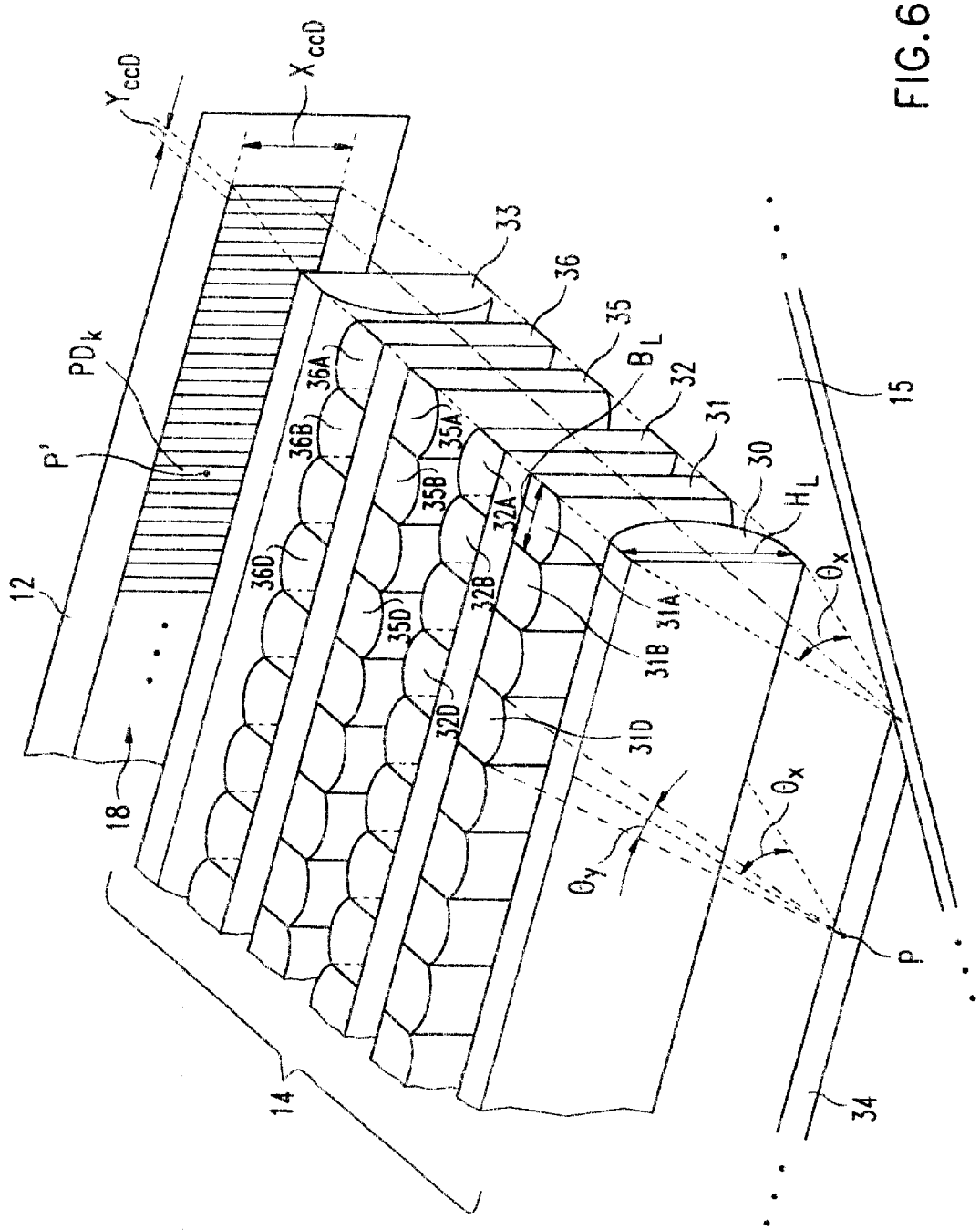
FIG. 6 is a schematic representation of a device based on the invention with a second preferred embodiment of the optical projection device.

FIG. 6 shows another example for the configuration of the projection device 14. In addition to the four collection lenses 30–33 shown in FIG. 5, the projection device 14 shown in FIG. 6 includes two additional collection lenses. A fifth collection lens 35 is inserted between the third collection lens 32 and the fourth collection lens 33, and a sixth collection lens 36 is inserted behind this fifth collection lens 35. These two collection lenses 35 and 36 are basically arranged in the same manner as is the second collection lens 31 or the third collection lens 32. The fifth and sixth collection lenses 35 and 36 also consist of sections cylindrical in shape. The fifth and sixth lenses serve to create a non-inverted image of the information during the projection of the information read from the excited row 34 onto the light-sensitive surfaces of the CCD row 12. The orientation of the information in the row 34 is not changed during the projection onto the light-sensitive surfaces 18 in the direction B.

The projection device 14 is advantageously realized using micro-lenses. These could be very compact in design so that small [external dimensions] can be ensured during realization of the reader head and thereby the X-ray cassette. Additionally, they are of low weight. Such micro-lenses can be obtained, for example, from LIMO-Lissotschenko Mikrooptik GmbH, Hauert 7, 44227 Dortmund, Germany.

The projection of the emission radiation emitted from the excited row 34 would advantageously be at a scale of 1:1. In this manner, optimum light output of the emission radiation onto the photo-detector of the CCD row 12 can be obtained. In any event, it is also possible to perform such projection at a reduced projection scale. This particularly applies to the projection perpendicular to direction A of row 34. In this manner, additional points of the excited row 34 can be projected onto the light-sensitive surface by means of suitable configuration of the photo-detector light-sensitive surfaces. Points that can not be projected by the excited row 34 onto the light-sensitive surfaces of some photo-detectors at a projection scale of 1:1 can be collected by the light-sensitive surfaces at a reduced projection scale.

There has thus been shown and described a novel apparatus for reading information stored in a memory layer, and an X-ray cassette for use with the apparatus, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for reading information stored in a memory layer, said apparatus comprising, in combination:
    (a) a radiation source for producing a radiation beam to excite a row of the memory layer; and
    (b) a receptor for receiving the emission radiation that may be produced from the memory layer because of the excitation of the radiation beam, the receptor comprising a plurality of light sensitive surfaces immediately adjacently arranged in a row to form a substantially unbroken light-sensitive area from one end of the row to the other, the individual light-sensitive surfaces of the receptor having a greater dimension perpendicular to the orientation of the row than in the direction of the row.

2. The apparatus recited in claim 1, wherein the dimension of the light-sensitive surfaces perpendicular to the orientation of the row is in the range of the two to eight times the dimension along the direction of the row.

3. The apparatus recited in claim 1, wherein the dimension of the light-sensitive surfaces perpendicular to the orientation of the row is in the range of two to four times the dimension along the direction of the row.

4. An X-ray cassette with a memory layer to store information and apparatus as recited in claim 1 for reading said information.

5. Apparatus for reading information stored in a memory layer, said apparatus comprising, in combination:
    (a) a radiation source for producing a radiation beam to excite a row of the memory layer;
    (b) a receptor for receiving the emission radiation that may be produced from the memory layer because of the excitation of the radiation beam, the receptor comprising a number of light-sensitive surfaces adjacently arranged in a row; and
    (c) an optical projection device for projecting the emission radiation emitted from the memory layer into the receptor, the projection device comprising a number of projection sections arranged adjacent in a row, wherein the projection sections have a greater aperture angle with respect to an excited row of the memory layer perpendicular to the direction of the row than along the direction of a row.

6. The apparatus recited in claim 5, wherein the light-sensitive surfaces of the receptor have a greater dimension perpendicular to the direction of the row than along the direction of the row.

7. The apparatus recited in claim 5, wherein the optical projection device provides projection of emission radiation emitted from the excited row at a scale of 1:1.

8. The apparatus recited in claim 5, wherein the optical projection device provides a reduced projection scale perpendicular to the direction of the row as compared to that along direction of the row.

9. The apparatus recited in claim 5, wherein the optical projection device is so configured that the information read out from the memory layer may be projected onto the receptor in the same orientation as it was stored in the excited row of the memory of the memory layer.

10. The apparatus recited in claim 5, wherein the optical projection device includes a filter that is opaque to the excitation radiation.

11. An X-ray cassette with a memory layer to store information and apparatus as recited in claim 5 for reading said information.

* * * * *